May 14, 1940.  B. A. DIGGINS ET AL  2,200,594
METHOD AND APPARATUS FOR AERIAL MAPPING
Filed Sept. 17, 1937  3 Sheets-Sheet 1

BARTHOLOMEW A. DIGGINS
OTTO E. TRAUTMANN
INVENTORS

BY *J. A. Ellestad*
ATTORNEY.

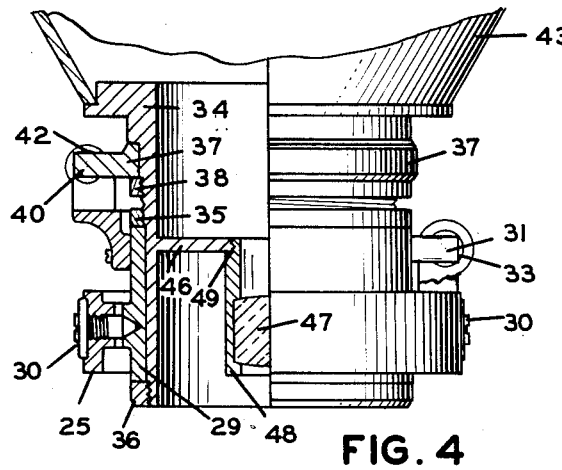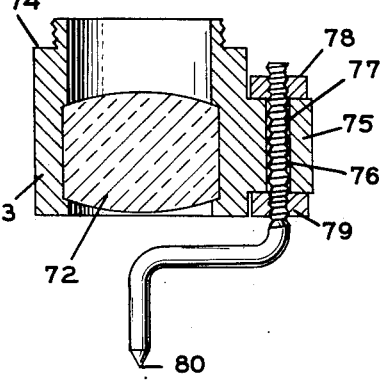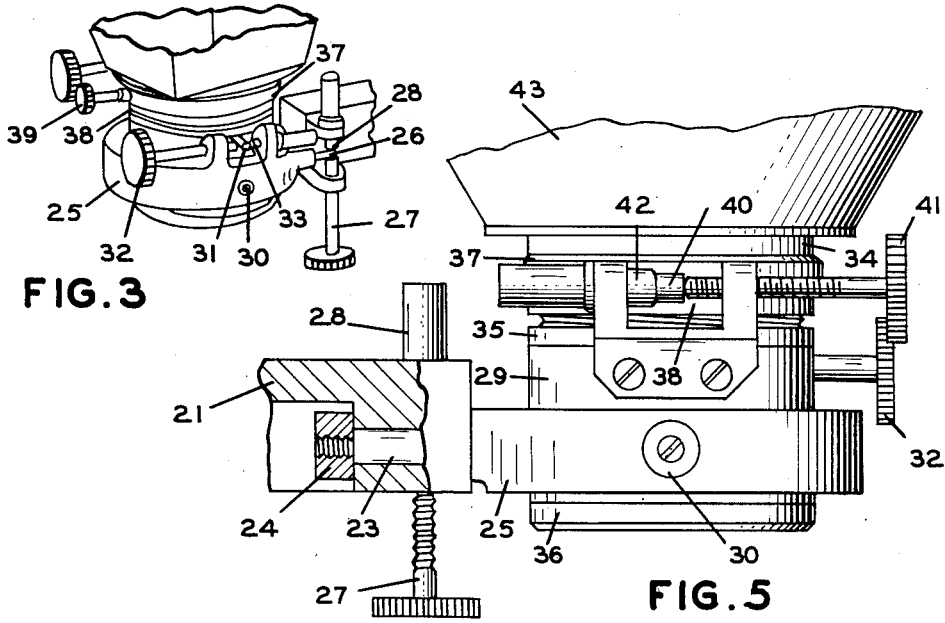

BARTHOLOMEW A. DIGGINS
OTTO E. TRAUTMANN
INVENTORS

Patented May 14, 1940

2,200,594

UNITED STATES PATENT OFFICE 2,200,594

METHOD AND APPARATUS FOR AERIAL MAPPING

Bartholomew A. Diggins, Rochester, and Otto E. Trautmann, Irondequoit, N. Y., assignors to Bausch & Lomb Optical Company, Rochester, N. Y., a corporation of New York Application September 17, 1937, Serial No. 164,386

13 Claims. (Cl. 88—24)

The present invention relates to a method and apparatus for making maps from aerial photographs.

One of the objects of the present invention is to provide a new and improved method and apparatus for making maps from aerial photographs. Another object is to provide a method and apparatus for forming rectified diapositives of aerial photographs. A further object is to provide a method and apparatus for using rectified diapositives for aerial mapping. These and other objects and advantages reside in certain novel features of construction, arrangement and combination of parts and processes as will hereinafter be more fully set forth and pointed out in the appended claims.

Referring to the drawings:

Fig. 3 is an enlarged fragmentary view of the adjusting mechanism of one of the rectifying projectors.

Fig. 4 is a front elevation of same with parts in section.

Fig. 5 is a fragmentary side elevation of same with parts in section.

Fig. 6 is a section of the printing lens.

Figure 1:
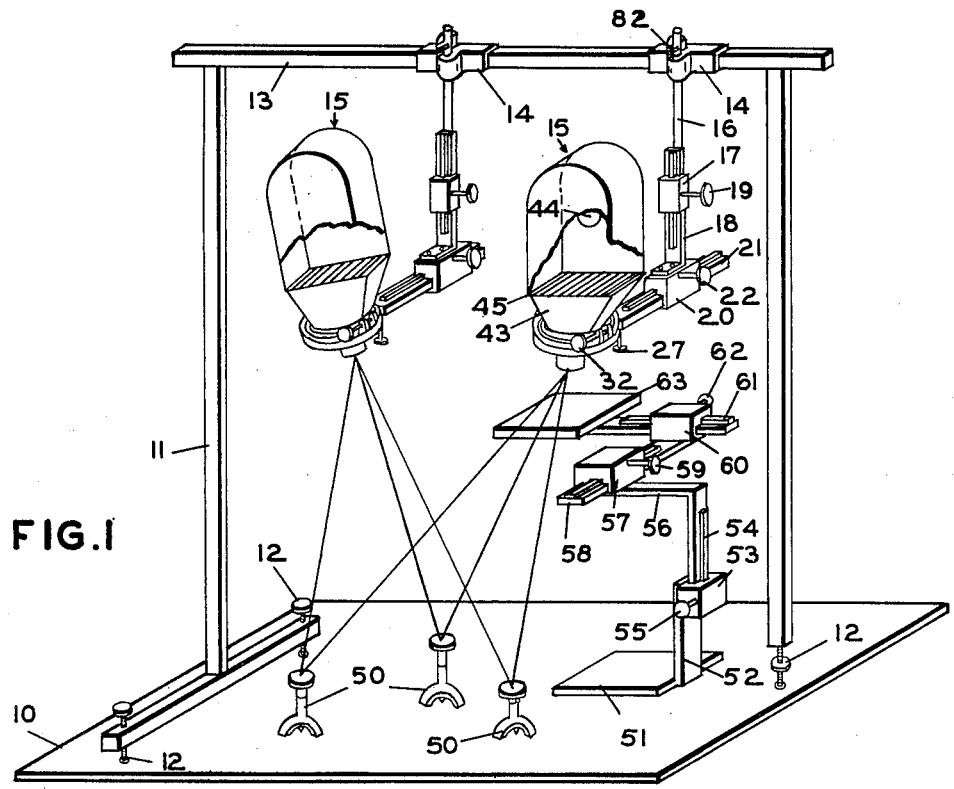
Fig. 1 is a perspective view of a rectifying printing apparatus embodying the present invention.

One embodiment of the present invention is illustrated in the drawings wherein 10 designates a reference surface such as a table top or drawing board. A projector supporting frame 11 is adjustably carried upon the surface 10 by three screw feet 12 so that the frame 11 can be tilted relative to the surface 10. The frame 11 has a long substantially horizontal bar 13 upon which the two projector supporting brackets 14 are slidable.

The two projectors 15 of the rectifying apparatus of the present invention are identical so only one will be described. A rod 16 depends vertically from the bracket 14 and carries at its lower end a block 17 in which the slide 18 is vertically novable by the rack and pinion mechanism indicated generally at 19. A second block 20 is secured at the lower end of the slide 18 and receives the horizontally movable slide 21. A rack and pinion mechanism indicated generally at 22 serves to move the slide 21.

A shaft 23 is horizontally rotatably secured in the outer end of the slide 21 by a nut 24 and carries at its outer end a ring 25. The mounting of the projector in this ring 25 is substantially identical with the mounting described and claimed in application Serial No. 151,689 filed July 2, 1937 by Otto E. Trautmann for a Projector, and hence this mounting will be only briefly described in the present case.

The ring 25 has a rearwardly extending lug 26 which is engaged by a screw 27 carried by the slide 21 for pivotal movement on the shaft 23. A spring pressed plunger 28, also carried by the slide 21, holds the lug 26 against the screw 27. A second ring 29 is mounted within the ring 25 on pivot pins 30 so that its pivotal axis is perpendicular to and coplanar with the axis of the shaft 23. A lug 31 extends from the ring 29 and is engaged by a screw 32 carried by the ring 25. A spring pressed plunger 33 holds the lug 31 in engagement with the screw 27.

A sleeve 34 is rotatably mounted within the second ring 29 and is held against axial movement by threaded collars 35 and 36, which engage the upper and lower edges, respectively, of the ring 29. The axis of rotation of the sleeve 34 is perpendicular to the axes of the shaft 23 and the pivot pins 30. A ring 37 is rotatably mounted on the sleeve 34 by a collar 38 and this ring 37 can be locked against rotation by a set screw 39. A lug 40 projects from the ring 37 and is engaged by a screw 41 carried by the second ring 29. A spring pressed plunger 42 holds the lug 40 in engagement with the screw 41.

The body 43 of the projector 15 is secured on top of the sleeve 34 in any suitable manner. This body contains the usual illuminating means 44 and a suitable transparency support 45. This transparency support may be of any desired form but the form shown in the above-mentioned application Serial No. 151,689 filed July 2, 1937 by Otto E. Trautmann is preferred.

Within the sleeve 34 is a web 46 for supporting the projection lens 47. This lens 47 is mounted in a tube 48 having a shoulder 49 which abuts against the web 46 when the rear nodal point of the lens 47 has the same relation to the projection transparency as the rear nodal point of the protographic objective had to the film at the time of exposure. The projection objective 47 should be the same as the photographic objective except that it will have a shorter focal length. The front nodal point of the projection objective 47 will preferably coincide with the intersection of the axes of sleeve 34, ring 29 and shaft 23 but this is not absolutely essential. The position of the front nodal point of the objective 47 relative to these axes can be adjusted by adjusting the collars 35 and 36.

In use, two photographs are taken of an area containing at least three points whose locations in space are known. Three control markers 50 are then placed on the reference surface 10 in the exact map positions of the three points and the control markers are set at the proper height for the points. In actual practice, four or more controls would be used because three points can give an indeterminate result but the three points suffice for illustration.

Transparencies of the area are placed in the projectors 15 and the projectors are illuminated preferably one with red and one with green. The images are viewed throuugh red and green spectacles and the observer then sees a stereoscopic or anaglyphic light model.

The two projectors 15 are adjusted relatively to each other and to the reference surface 10 until the two images of each point coincide upon the proper control marker 50. The two projectors 15 then occupy the same positions relative to the control markers 50 that the cameras occupied relative to the known points at the instant of exposure.

A stand 51 is then placed on the reference surface 10. This stand has an upright portion 52 which carries a block 53. A slide 54 is vertically adjustable in the block 53 under the control of a rack and pinion indicated at 55 and a horizontal extension 56 on the slide 54 carries at its outer end a block 57. A slide 58 is horizontally adjustable in the block 57 under the control of a rack and pinion mechanism 59 and the slide 58 carries at its outer end a block 60. A slide 61 is horizontally adjustable in the block 60 perpendicular to the slide 58 and is actuated by a rack and pinion mechanism 62. A suitable film or plate support 63 is mounted at the outer end of the slide 61 and the parts of the adjusting mechanisms between the stand 51 and support 63 are such that the support 63 lies in a plane parallel to the plane of the reference surface 10.

Figure 8:
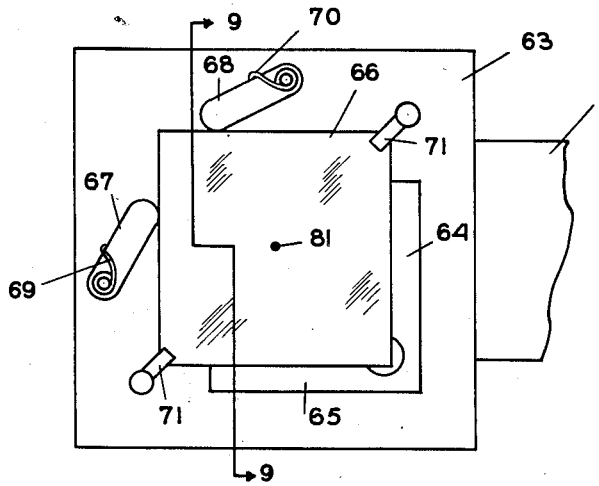
Fig. 8 is a plan view of the printing support.
Figure 9:
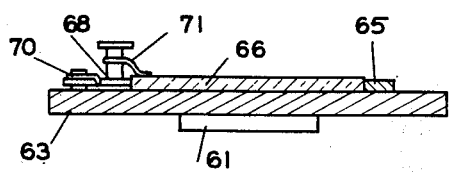
Fig. 9 is a section taken on line 9—9 of Fig. 8.

As best shown in Figs. 8 and 9, the support 63 has on its upper surface stops 64 and 65 for engaging adjacent sides of a photosensitive material such as the plate 66. Two arms 67 and 68 under the influence of springs 69 and 70, respectively, urge the plate 66 against the stops 64 and 65, respectively, while two spring clips 71 hold the plate 66 flat against the support 63.

When each projector 15 has been properly oriented, the projection objective 47 in its tube 48 is removed and the printing objective 72 of Fig. 6 substituted. This printing objective 72 is optically similar to the projection objective 47 but has a shorter focal length. The printing objective 72 is mounted in a sleeve 73 provided with a shoulder 74 which abuts against the web 46 when the rear nodal point of the objective 72 occupies the same position relative to the transparency 45 that the rear nodal point of the projection objective 47 occupied during projection. A projection 75 on the side of the sleeve 73 is provided with a longitudinal guide 76 in which an arm 77 is rotatably journalled. Nuts 78 and 79 are threaded, respectively, above and below the projection 75 to hold the arm 77 against axial movement.

The arm 77 extends over toward the optical axis of the objective 72 and terminates in a point 80 which is on the optical axis of the objective 72 and a predetermined distance from the front nodal point. This distance is determined by the minification desired in printing according to the conventional lens formulae.

The plate 66 on the support 63 is provided at its center with a mark or dot 81 and the support 63 is adjusted until the dot 81 is in contact with the point 80. The printing exposure is then made and a rectified image of the original photograph is formed on the plate 66. If the reference surface 10 is taken as some horizontal plane in nature such as sea level, the plate 66 will be accurate horizontalized.

When making a map it is necessary to set up and rectify the pictures in proper sequence. Assuming that the left-hand projector in Fig. 1 contains the first exposure, and the right-hand projector the second, after the diapositive prints have been made, it is necessary to orient the third exposure relative to the second. For this reason, the rod 16 is made rotatable in the bracket 14 and a stop 82 limits the rotation of this rod 16 in the bracket 14 to 180 degrees. The rod 16 is preferably stopped in the two extreme positions by a suitable latching means, not shown. Both projectors are turned through 180 degrees on the rods 16 and the first photograph is removed from its projector and the third photograph substituted. Since both projectors have been rotated 180 degrees, the third photograph will be in proper relation to the second photograph to continue the traverse. Proper orientation of the projectors on the known points of the area common to the second and third photographs, is now obtained and the printing process repeated.

Figure 2:
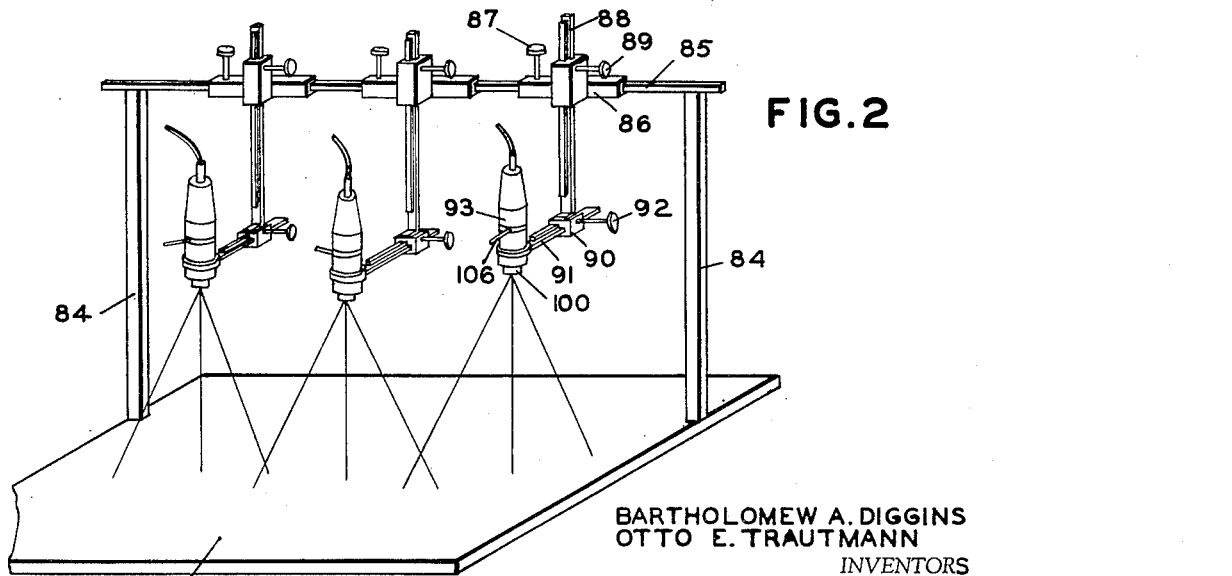
Fig. 2 is a perspective view of the mapping projectors embodying the present invention.
Figure 7:
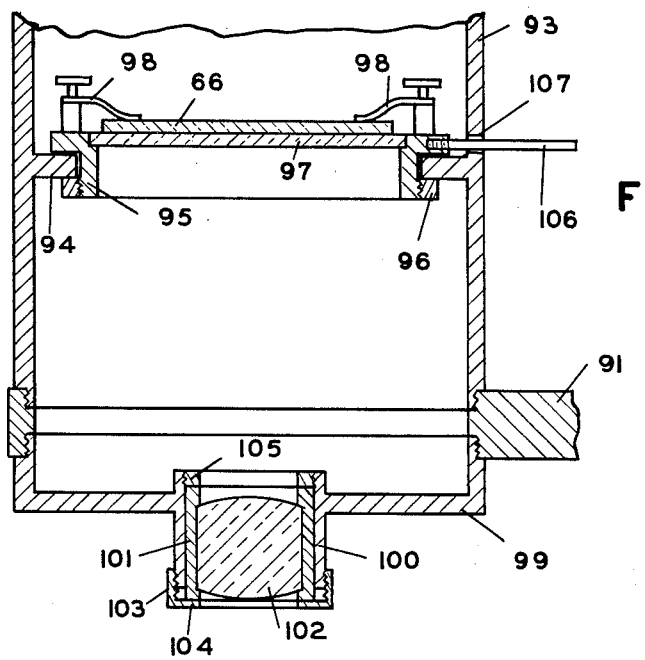
Fig. 7 is a fragmentary vertical section of one of the mapping projectors.

The rectified diapositives made on the plates 66 are then placed in the mapping apparatus shown in Figs. 2 and 7. This mapping apparatus comprises a mapping surface 83 upon which are mounted two upright supports 84 carrying the projector bar 85. This bar may be of any desired length and may carry any number of projectors but for convenience only three projectors are illustrated. Since each of the mapping projectors are identical, only one will be described.

A bracket 86 is slidably mounted on the bar 85 and is movable therealong by means of a rack and pinion mechanism indicated at 87. A slide 88 is vertically adjustable in the bracket 86 by means of a rack and pinion mechanism 89, and carries at its lower end a block 90. A slide 91 is horizontally adjustable in the block 90 by means of a rack and pinion 92 and the projector 93 is fixedly secured on the outer end of the slide 91.

Above the slide 91, the projector 93 has an inwardly extending circular flange 94 and the diapositive support 95 is rotatably journalled in this flange and held against longitudinal movement by a collar 96. The diapositive plate 66 is supported on a glass plate 97 and held in contact therewith by spring clips 98. The diapositive plate 66 is centered on the optical axis of the projector by means of the dot 81 and a corresponding mark, not shown, on the glass plate 97. Preferably some form of mechanical centering means, such as that shown in the aforementioned application Serial No. 151,689 filed July 2, 1937 by Otto E. Trautmann is used, but the diapositive can be centered manually.

A lens supporting cap 99 is fixed below the slide 91 and has a central sleeve 100 in which the cell 101 carrying the objective 102 is slidably mounted. The rear nodal point of the objective 102 must bear the same relation to the diapositive plate 66 that the projecting and printing lenses 47 and 72

72, respectively, bore to the photograph 45. This is accomplished by a collar 103 externally threaded on the sleeve 100 and having an inwardly projecting flange 104. The cell 101 rests on this flange 104 and the objective is thus adjusted until its rear nodal point is in proper relation to the diapositive supporting plate 97. The cell 101 and objective 102 are then locked in position by the ring 105.

The mapping projectors are set up using suitable control markers of the type shown at 50 in Fig. 1. To orient these projectors, the only necessary adjustments are the three linear movements under the three rack and pinion mechanisms 87, 89 and 92 and rotation of the diapositive support 95 by means of the handle 106 which extends through a slot 107 in the wall of the projector 93. This orientation is simple and can be readily and rapidly accomplished.

The projectors are illuminated alternately red and green, the anaglyphic spectacles are worn and the map is plotted by the well known technique.

From the foregoing it will be apparent that we are able to attain the objects of our invention and provide a new and improved method and apparatus for mapping from aerial photographs. The apparatus shown for performing the method is, for the most part, diagrammatic and merely for the purpose of illustration. Various modifications can obviously be made without departing from the spirit of our invention or the scope of the appended claims.

We claim:

1. The method of rectifying aerial photographs which comprises taking two aerial photographs of an area containing at least three points whose locations in space are known, placing said photographs in projectors, orienting said projectors to produce a stereoscopic light model of said area, placing control markers on a reference surface so that they are in the same relative positions as the known points in space, orienting said projectors until the known points in the light model coincide with the proper control markers, placing a piece of photosensitive material in predetermined position parallel to said reference surface in the path of one of said projectors, focusing the photograph in said projector on the photosensitive surface of said material, and printing said photograph on said photosensitive surface.

2. The method of rectifying aerial photographs which comprises taking two aerial photographs of an area containing at least three points whose locations in space are known, placing said photographs in projectors, orienting said projectors to produce a stereoscopic light model of said area, placing control markers on a reference surface so that they are in the same relative positions as the known points in space, orienting said projectors until the known points in the light model coincide with the proper control markers, placing a piece of photosensitive material in predetermined position in the path of one of said projectors parallel to said surface, focusing said photograph in said projector on the photosensitive surface of said material, printing said photograph on said photosensitive surface, placing the print made on said photosensitive material in another projector and using the projected image of said print to make a map.

3. The method of rectifying airplane photographs which comprises taking two photographs of an area containing at least three points whose locations in space are known, arranging control markers on a reference surface in the same relative positions as the known points in space, placing said photographs in projectors, orienting said projectors relative to each other and to said markers until the images of the known points from both projectors coincide on the proper control marker, locating a piece of photosensitive material in the path of one of said projectors, focusing said photograph in said projector on the photosensitive surface of said material, and printing said photograph on said photosensitive surface while maintaining said photosensitive surface parallel to said reference surface.

4. The method of rectifying airplane photographs which comprises taking two photographs of an area containing at least three points whose locations in space are known, arranging control markers on a reference surface in the same relative positions as the known points in space, placing said photographs in projectors, orienting said projectors relative to each other and to said markers until the images of the known points from both projectors coincide on the proper control marker, locating a piece of photosensitive material in the path of one of said projectors, focusing the photograph in said one projector on the photosensitive surface of said material, printing said photograph on said photosensitive surface while maintaining said photosensitive surface parallel to said reference surface, placing the print made on said photosensitive material in another projector, and using the projected image of said print to make a map.

5. An apparatus for making a map from aerial photographs of an area containing at least three points whose locations in space are known, comprising two projectors each having means for supporting one of said photographs, means for adjustably mounting said projectors, a reference surface, a plurality of control markers, said control markers being arranged on said reference surface in the same relative positions as the known points in space, means for adjusting said projectors until the images of the known points from both projectors coincide with the control markers, means for supporting a photosensitive surface in the path of one projector and parallel to said reference surface, and means for focusing said photograph in said projector on said photosensitive surface.

6. An apparatus for making a map from aerial photographs of an area containing at least three points whose locations in space are known, comprising two projectors each having means for supporting one of said photographs, means for adjustably mounting said projectors, a reference surface, a plurality of control markers, said control markers being arranged on said reference surface in the same relative positions as the known points in space, means for adjusting said projectors until the images of the known points from both projectors coincide with the control markers, means for supporting a photosensitive surface in the path of one projector and parallel to said reference surface, means for locating said photosensitive surface relative to said projector, and means for focusing said photograph in said projector on said photosensitive surface.

7. An apparatus for making a map from aerial photographs of an area containing at least three points whose locations in space are known, comprising two projectors each having means for supporting one of said photographs, means for adjustably mounting said projectors, a reference surface, a plurality of control markers, said control markers being arranged on said reference surface in the same relative positions as the known points in space, means for adjusting said projectors until the images of the known points from both projectors coincide with the control markers, means for supporting a photosensitive surface in the path of one projector and parallel to said reference surface, means for locating said photosensitive surface relative to said projector, means for focusing said photograph in said projector on said photosensitive surface, means for making a reduced diapositive from said photosensitive surface, a mapping projector, means for locating said diapositive in said mapping projector, and means for drawing a map from the projected image of said diapositive.

8. The method of rectifying aerial photographs of an area containing at least three points whose location in space is known comprising arranging control markers in the same relative positions as the known points in space, placing said photographs in projectors, orienting said projectors relatively to each other to produce a stereoscopic light model of said area, orienting said projectors together to bring the images of the known points into coincidence with said markers, placing a photosensitive sheet in the optical path of one of said projectors, maintaining said sheet parallel to said reference surface, focusing said photograph in said projector on said sheet, and exposing said sheet to form a rectified print.

9. The method of rectifying aerial photographs which comprises taking two photographs of an area containing at least three points whose locations in space are known, arranging control markers on a reference surface in the same relative positions as the three known points, placing the photographs in two projectors, orienting said projectors to form a stereoscopic light model with the images of the three points coinciding with the three markers, placing a photosensitive sheet in the path of one of said projectors at a distance to give a predetermined magnification, maintaining said sheet parallel to said reference surface, focusing said photograph in said one of said projectors on said sheet, and exposing said sheet to obtain a rectified print.

10. An apparatus for rectifying aerial photographs of an area containing at least three points whose locations in space are known, comprising supporting means, two projectors independently adjustably carried by said supporting means, means on each projector for supporting one of said photographs, a reference surface, control markers arranged on said surface in the same relative positions as said points, means for orienting said projectors to form a stereoscopic light model of said area with the images of the known points coinciding with the markers, means for supporting a photosensitive sheet in the path of one of said projectors and parallel to said surface, means on said projector for positioning said sheet to procure a predetermined magnification, and means for focusing said photograph in said one of said projectors on said sheet.

11. An apparatus for rectifying aerial photographs of an area containing at least three points whose locations in space are known, said apparatus comprising a support, two projectors independently adjustably mounted on said support, means on each of said projectors for supporting one of said photographs, a reference surface, a plurality of control marks arranged on said reference surface in the same relative positions as the three known points in space, means for orienting said projectors relatively to each other to obtain a light model of the area covered by said photographs, means for orienting said support to bring the images of the known points on the light model into coincidence with the control marks, a photosensitive sheet support, means for positioning said photosensitive sheet support in predetermined position relative to said projector and parallel to said reference surface, and means for focusing said photograph in said projector on said sheet.

12. An apparatus for rectifying aerial photographs of an area containing at least three points whose locations in space are known, said apparatus comprising a support, two projectors independently adjustably mounted on said support, means on each of said projectors for supporting one of said photographs, a reference surface, a plurality of control marks arranged on said reference surface in the same relative positions as the three known points in space, means for orienting said projectors relatively to each other to obtain a light model of the area covered by said photographs, means for orienting said support to bring the images of the known points on the light model into coincidence with the control marks, a carrier mounted on said reference surface, a photosensitive sheet support adjustably mounted on said carrier parallel to said surface, means for adjusting said sheet support until it is in the light path of one of said projectors, means for adjusting said sheet support to a predetermined distance from said projector, and means for focusing said photograph in said projector on said sheet.

13. An apparatus for rectifying aerial photographs of an area containing at least three points whose locations in space are known, said apparatus comprising a support, two projectors independently adjustably mounted on said support, means on each of said projectors for supporting one of said photographs, a reference surface, a plurality of control marks arranged on said reference surface in the same relative positions as the three known points in space, means for orienting said projectors relatively to each other to obtain a light model of the area covered by said photographs, means for orienting said support to bring the images of the known points on the light model into coincidence with the control marks, a carrier mounted on said reference surface, a photosensitive sheet support adjustably mounted on said carrier parallel to said surface, means for adjusting said sheet support until it is in the light path of one of said projectors, means for adjusting said sheet support to a predetermined distance from said projector, means for focusing said photograph in said projector on said sheet, and complemental means carried by said projector and said sheet for insuring proper location of said sheet.

BARTHOLOMEW A. DIGGINS.
OTTO E. TRAUTMANN.